United States Patent [19]

Grupp et al.

[11] Patent Number: 5,740,130
[45] Date of Patent: Apr. 14, 1998

[54] DECORATION DISPLAY DEVICE AND TIMEPIECE COMPRISING SUCH DISPLAY DEVICE

[75] Inventors: Joachim Grupp, Neuchâtel; Yvan Terés, Cressier; Jean-Charles Poli, Les Geneveys-sur-Coffrane, all of Switzerland

[73] Assignee: SMH Management Services AG, Biel, Switzerland

[21] Appl. No.: 785,136

[22] Filed: Jan. 13, 1997

[30] Foreign Application Priority Data

Jan. 23, 1996 [FR] France ........................ 96 00741

[51] Int. Cl.⁶ .................... G04C 19/00; G04C 17/00; G02F 1/1343
[52] U.S. Cl. .................... 368/82; 368/84; 368/232; 368/242; 349/113
[58] Field of Search ................ 368/82–84, 223, 368/228, 239–242; 349/113, 84–87

[56] References Cited

U.S. PATENT DOCUMENTS

| | | | |
|---|---|---|---|
| 3,881,809 | 5/1975 | Fergason et al. | 350/160 L |
| 4,488,818 | 12/1984 | Saurer et al. | 368/71 |
| 4,519,679 | 5/1985 | Horikiri et al. | 350/339 R |
| 5,153,760 | 10/1992 | Ahmed. | |
| 5,617,231 | 4/1997 | Vinouze et al. | 349/112 |

FOREIGN PATENT DOCUMENTS

| | | |
|---|---|---|
| 625721 | 11/1994 | European Pat. Off. . |
| 2242052 | 9/1991 | United Kingdom . |

*Primary Examiner*—Vit W. Miska
*Attorney, Agent, or Firm*—Sughrue, Mion, Zinn, Macpeak & Seas, PLLC

[57] ABSTRACT

Device producing an aesthetic effect by means of a field-effect or charge-effect optical shutter (5), allowing, by the switching of a power source (8), a colored decorative design (11) printed onto a non Lambertian optimized diffuse reflector (12), placed against the back face (5a) of the optical shutter, to be uncovered or masked; timepiece wherein the dial is formed wholly or partly by such a device.

10 Claims, 2 Drawing Sheets

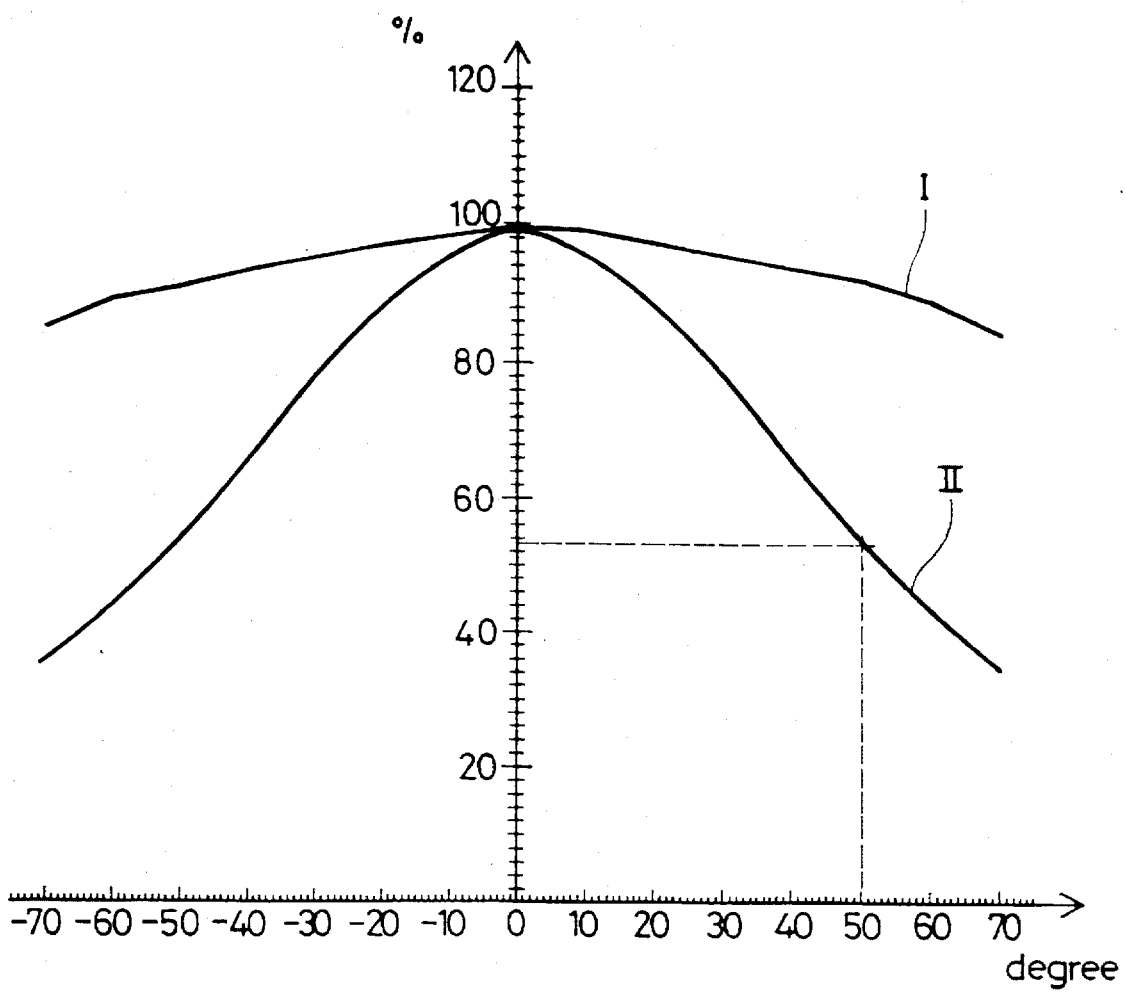

DECORATION DISPLAY DEVICE AND TIMEPIECE COMPRISING SUCH DISPLAY DEVICE

The present invention concerns a display device providing an aesthetic effect by means of a field-effect or charge-effect optical shutter, allowing a coloured decorative design, placed against its back face, to be uncovered or masked, without any power supply other than that necessary for the change of state of said optical shutter.

The invention also concerns a timepiece, such as a watch, an alarm clock or a clock-pendulum, wherein all or part of the dial comprises a display device controlled by the switching of a power source, as a function of a signal triggered by the actuation of an external control element, or by a signal received from the time base of said timepiece.

Certain devices allowing a decorative design, which is not permanently visible, to be displayed on a timepiece dial, are already known. Many of such devices comprise transparent decorated disks, most often driven by the timepiece movement.

For example, U.S. Pat. No. 3,763,648 discloses a watch wherein a transparent disk driven by the second hand comprises designs intended to co-operate with other designs carried by the watch-crystal to form a decoration.

A decoration carried by the dial of a timepiece may also be uncovered or masked by means of a control element independent of the working of the timepiece itself. Thus, in Swiss patent 465 507, an optical system formed of two superimposed polarising disks is placed between a decoration carried by the dial and the crystal of the timepiece. Manual rotation of one of the disks allows a decoration to be uncovered or masked.

In all such devices, it will be observed, either that the decorative design partially remains apparent, or that it is necessary to add control accessories, thereby modifying the usual external appearance of the timepiece.

The use of an optical shutter, more precisely of a liquid crystal cell, and of a projected or illuminated diapositive is disclosed in U.S. Pat. No. 3,576,364 in order to obtain, according to three proposed embodiments, an advertising sign having a particular effect. In one embodiment, the diapositive is placed against the back face of the cell to be observed from the front face by transparency, thanks to a strong lighting of the back face. It thus appears that such a device is bulky, consumes a lot of power and is not in any event suitable for use in a timepiece.

In French patent 2 117 886, an optical shutter device allows images printed on a transparent film interposed between a mirror and said optical shutter to be uncovered or masked, said images being then observed by transparency, i.e. via reflection of the light rays on the mirror, which makes the quality of the perceived image very dependent upon the observation angle. Moreover, the light intensity losses caused by the reflections at each interface considerably reduces the luminosity of the observed image.

An object of the invention is to overcome the drawbacks of such prior art by providing a device which allows a coloured decorative design, placed behind an optical shutter, to be masked or uncovered providing, when the optical shutter is in transmission mode, a more luminous and contrasted image than that obtained with known devices, and in particular with that disclosed in French patent 2 117 886. The device according to the invention also has the advantage of being able to be constructed by assembly of a smaller number of elements, and thus with a lower production cost.

Another object of the invention is to provide a device which requires only a low power consumption to allow the observer to obtain the desired aesthetic effect.

The invention thus concerns a display device comprising:
a coloured decorative design,
an optical shutter having a front face through which the decorative design is observed and a back face facing which is placed a diffuse reflector and against which the coloured decorative design is placed, said shutter being capable of changing from an opaque state to a transparent state by application of an electric voltage thereto, and
a power source having a control device arranged for applying an electric voltage necessary for the change of state of said optical shutter;
characterised in that said diffuse reflector is not of the lambertian type and in that the coloured decorative design comprises ink directly printed onto said diffuse reflector, without appreciably modifying its surface aspect.

The aesthetic effect of the display device according to the invention thus results from the combined effect of the choice of a non-lambertian diffuse reflector, i.e. having a non specular reflection, but having a much more directive diffusion lobe than that of a lambertian diffuse reflector, and the printing of a coloured decorative design directly onto said diffuse reflector, thereby eliminating the parallax effect and the luminosity losses via reflections which a transparent support of the diapositive type had, in particular because of its thickness.

Different known types of optical shutters may be used, but a liquid crystal cell will be preferably selected for its reduced power consumption, in particular for applications in a timepiece. In applications wherein power consumption is not a critical element, for example in a miniature clock, one may also use electrochromic or electrochemical cells which require much more power to change from one state to another.

The liquid crystal cell which may be used in the device according to the invention may be any known cell capable of changing from a non-transparent state to a transparent state when the electric field is switched. For example, a so-called "Heilmeir" cell may be used, said cell comprising a layer of liquid crystal comprising a nematic compound of positive dielectric anisotropy and a pleochroic dye selected in order to have a good visible light absorption coefficient in a determined wavelength. In order to have the most perfect possible masking of the coloured decorative design, a pleochroic dye having a high absorption coefficient in most wavelengths will be selected, so that the cell is substantially black in the absence of an electric field. Such a dye is disclosed for example in patent DE 3 028 593.

By using a so-called "Twisted-nematic" cell comprising parallel axes polarisers, placed in front and behind the liquid crystal layer, the appearance of the cell is uniformly dark in the absence of an electric field. A reverse effect is obtained with a cell constructed with crossed axes polarisers. Whatever the type of cell, the electrodes carried by the internal faces of the transparent plates, between which the liquid crystal layer is situated, are transparent at least in the zone in which the decoration is situated.

The diffuse reflector used is, preferably, formed by a metal-plated plastic sheet having optimized optical properties, i.e. opposite properties to those of a lambertian diffuse reflector which diffuses the entire incident light in all directions. A diffuse reflector particularly well suited to the device according to the invention has a rectified diffusion lobe for which a luminance of the order of 50% is obtained in the direction of a ray forming an angle of between 40° and 60° and preferably 50° with a line perpendicular to the plane of the diffuse reflector.

The inks used are of the type of those used in quality printing, for example on non-absorbent glossy paper. Amongst all known printing methods, experience has shown that heliography is the method most suitable for small series production, and to the deposition of a sufficiently thin layer of ink not to modify the surface aspect of the diffuse reflector.

When the device according to the invention is incorporated in a timepiece, the face of the cell forming the dial may also bear a decoration or signs, such as the name of the manufacturer or hour symbols, without departing from the scope of the invention. Likewise, when the decorative design does not occupy the entire dial, the part left available may also be used for a standard digital segment display. The dial may also be formed of several juxtaposed devices according to the invention. In the event that the timepiece is provided with an analogue display, passages may be provided for the pipes carrying the hands through the cell and the diffuse reflector carrying the coloured decorative design.

In a timepiece, the switching of the cell from one state to another may be effected by manipulation of a pre-existing control element, such as the crown, or by means of an additional element such as a push button. Such switching may also be effected at a predetermined moment via a signal received from the time base, such as an alarm time or a birthday date.

The features and the advantages of the invention will be better understood upon reading the description which follows, given solely by way of example and made with reference to the attached drawings, in which:

FIG. 3 is the representation, in an axial plane, of the diffusion lobes of an optimised diffuse reflector according to the invention and of a lambertian diffuse reflector.

Figure 1:
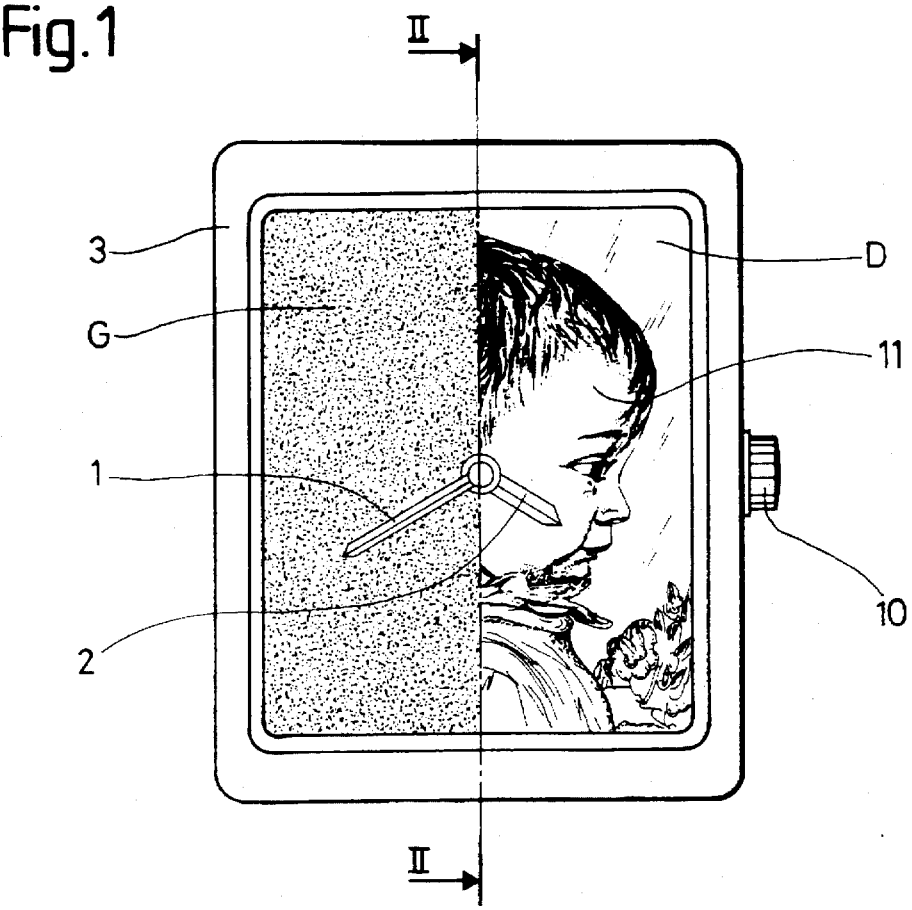
FIG. 1 is a top view of a watch in which the device according to the invention is incorporated.
Figure 2:
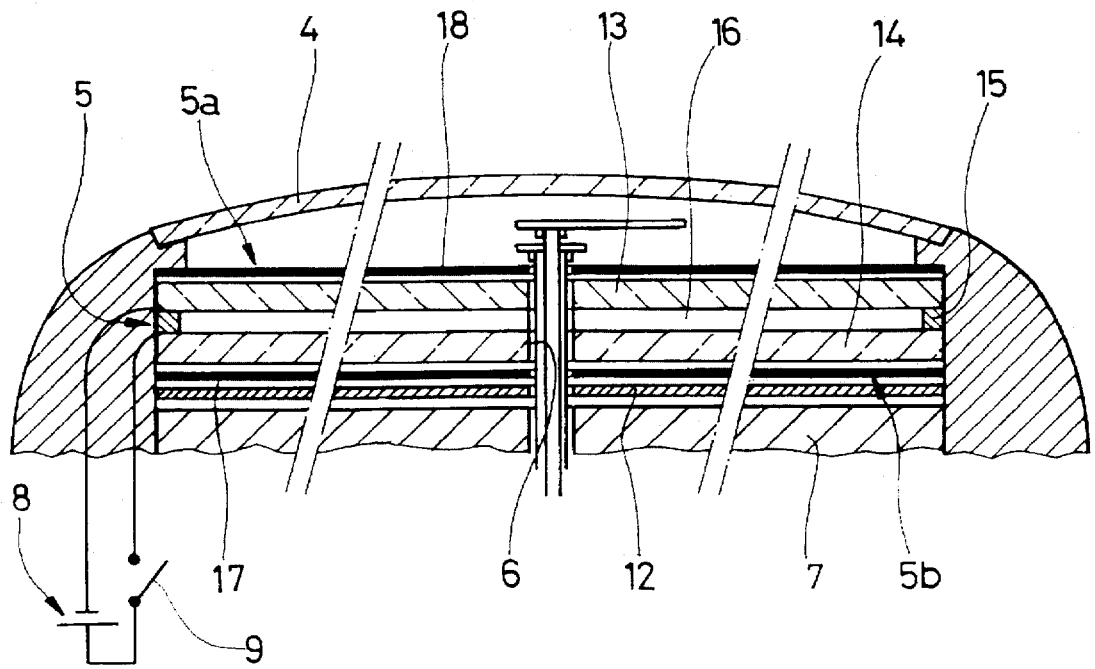
FIG. 2 is a schematic enlarged cross-section along line II—II of FIG. 1, the lower part of the watch, comprising in particular the movement, not being shown.

According to the example shown in FIGS. 1 and 2, an analogue display watch with hands 1, 2, comprises a case 3 closed by a crystal 4. Hands 1, 2 are arranged above the front face 5a of a liquid crystal cell 5 which forms the dial of the watch and which occupies all of the visible surface of the dial. Cell 5 comprises at its centre a passage 6 for the pipes carrying the hands which extend from the space comprised between crystal 4 and the front face of cell 5 to movement 7, the movement being only partially shown. The watch further comprises a power source 8, which may be connected to cell 5 via a control circuit symbolised by switch 9. Such control circuit may for example be actuated by crown 10 onto which successive pressures may be exerted to cause the state of liquid crystal cell 5 to change. Of course, the schematised elements may be made by any appropriate means. Thus, the control element allowing the control circuit to be acted upon may also be a device with photosensitive, capacitive or piezoelectric elements. The power source may be of any type, but it is preferably formed by battery of the timepiece. Coloured decorative design 11, printed onto diffuse reflector 12 is interposed between the back face 5b of cell 5 and the upper face of movement 7.

In FIG. 1, the left half G of the watch shows the appearance of the dial when liquid crystal cell 5 is opaque, and the right half D shows the appearance of the dial when the cell is transparent and allows coloured decorative design 11 to be shown.

In the cross-section shown in FIG. 2, cell 5 given by way of example is of the "Twisted-nematic" type. For the purposes of better understanding, the thicknesses of the components of the device have been considerably exaggerated, the complete cell having in reality a total thickness in the order of 0.9 mm. Such a cell comprises a transparent front plate 13, a transparent back plate 14, a sealing frame 15 delimiting, in co-operation with plates 13 and 14, a closed space 16 in which is situated a positive dielectric anisotropy nematic liquid crystal layer. Such a liquid crystal is for example that available from Merk under the reference ZLI-4468-000. The faces of plates 13 and 14 facing each other, each comprise, on their entire surface, a transparent electrode (not shown) of a known type, such as a thin mixed tin and indium oxide (ITO) layer. Cell 5 further comprises on the external face of plate 13 facing crystal 4, a first polariser 17 and on the external face of plate 14 facing movement 7 a second polariser 18, the two polarisers 17, 18 having their axes parallel. A coloured decorative design 11 printed onto diffuse reflector 12 is interposed between second polariser 18 and the front face of movement 7.

Coloured decorative design 11 is obtained according to well known printing techniques. "Overpigmented" type printing inks are selected with a solvent allowing colour saturation to be obtained with small thicknesses. Given the relatively small dimensions of the coloured decorative design used in a horological application, batch printing techniques will be advantageously used, implementing the heliographic printing method.

According to an essential feature of the invention the inks used to create the decorative design are applied onto the diffuse reflector with a sufficiently small thickness so that its state of surface and consequently its optical properties are not modified. Measurements effected on a test decorative design comprising the colours red, yellow, green, blue and grey, separated by bare zones of the diffuse reflector, using an electronic scanning comparator (Talystep I available from Taylor-Hobson—USA) have shown that a thickness of between 20 and 50 nm contributed only to increase the amplitude of the peaks of surface roughness, without statistically modifying the distribution and the frequency thereof. Conservation of the optical properties is confirmed by diffusion lobe measurements, as indicated hereinbefore.

Since the diffusion lobes have an envelope substantially generated by rotation about an axis perpendicular to the plane of the diffuse reflector, FIG. 3 shows, in an axial plane, the variation in the luminance expressed in relative percentage, as a function of the angle of observation measured with respect to the perpendicular. Reference curve I has been made with a lambertian diffuse reflector formed by a substrate having a BASO4 coating, and curve II with an optimised diffuse reflector according to the invention not comprising any ink on its surface. The absolute luminous intensities of the diffuse reflector around 0° position amply exceed the intensities of a lambertian diffuser, but for higher angles the intensities of the lambert diffuser exceed those of the diffuse reflector, i.e. the diffuse reflector used in the scope of the present invention concentrates the light in a cone around 0° position. A diffuse reflector corresponding to curve II is for example formed by a metal-plated plastic sheet, produced by Sanritsu Corporation, Shimotsuga Gun-Tochigi (Japan) under the reference WNA.

Similarly, the diffusion lobe curves have been recorded for an optimised diffuse reflector having on its surface the colours red, yellow, green, blue and grey. In the table hereinafter, the values of the angles for which a reduction in the luminance of 80% and 60% relative to the maximum for an observation under perpendicular incidence have been reported.

|  | Luminance | | |
|---|---|---|---|
|  | 100% | 80% | 60% |
| red reflector | 0° | 36° | 71° |
| yellow reflector | 0° | 34° | 60° |
| green reflector | 0° | 28° | 51° |
| blue reflector | 0° | 27° | 48° |
| grey reflector | 0° | 31° | 53° |
| bare reflector | 0° | 29° | 45° |

It is clear from this table that, for a luminance of 80%, there is an average angular value of 30.83% with a standard deviation of 3.54%, and for 60% an average angular value of 54.67% with a standard deviation of 9.48%, which shows that the diffusion lobes of these five colours have relatively low dispersion around the diffusion lobe of the bare optimised diffuse reflector. It will also be noted, referring to FIG. 3, that a reduction to 80% of the luminance for a lambertian diffuse reflector corresponds to an observation angle of 75%, while a same reduction to 80% is observed under an angle two times smaller with an optimised diffuse reflector according to the invention, whether or not coated with a coloured ink. This clearly establishes the surprising nature of the invention on the concentration of reflected light, and thus on the brightness of the coloured design.

In the example which has just been described, in the absence of an electric field, the liquid crystal has a twisted planar structure, which absorbs the two light components in such a way that the surface of cell 5 facing crystal 4 has a uniformly dark surface and masks coloured decorative design 11. When voltage is applied, via switch 9, the liquid crystal will switch and let the light pass and make design 11 visible. The reverse effect would be obtained if polarisers 17, 18 had crossed axes. Likewise, without departing from the scope of the invention, the man skilled in the art may use other types of cells and other types of liquid crystals whether or not associated with dichroic or pleochroic molecules.

It is to be noted that switch 9 symbolises any means allowing a control voltage to be applied to cell 5. When applied to a timepiece, this switch may be a switching transistor incorporated in the integrated circuit of movement 7. Such a transistor may in turn be controlled by various parameters connected to the time. For example, the transistor may be controlled periodically from the time base of the movement, by a signal based on the alarm if the movement is fitted therewith. The example which has just been described can be modified and adapted in numerous manners within the reach of the man skilled in the art without departing from the scope of the invention.

What is claimed is:

1. A display device comprising:

a coloured decorative design, an optical shutter having a front face through which the decorative design is observed and a back face behind which is placed a diffuse reflector and against which the coloured decorative design is placed, said shutter being capable of passing from an opaque state to a transparent state by application of an electric voltage thereto, and an power source provided with a control device arranged for applying the electric voltage necessary for the change of state of said optical shutter, wherein said diffuse reflector is not of the lambertian type and wherein the coloured decorative design is formed by an ink directly printed onto said diffuse reflector, without appreciably modifying the surface aspect.

2. A display device according to claim 1, wherein the diffuse reflector is a metal-plated plastic sheet having a diffusion lobe forming, with the direction perpendicular to its plane, an angle of between 40° and 60°, preferably 50° when the luminance is 50%.

3. A display device according to claim 1, wherein the coloured decorative design also comprises zones which are not coated with an ink.

4. A display device according to claim 1, wherein the optical shutter is a liquid crystal cell.

5. A device according to claim 4, wherein the liquid crystal cell is of the "Twisted-nematic" type and comprises parallel polarisers.

6. A timepiece comprising at least one movement intended to display the time in connection with dial, said movement being housed in a case closed by a crystal, wherein the dial of said timepiece constitutes wholly or partly the display device according to claim 1.

7. A timepiece according to claim 6, wherein the switching of the power source is effected by means of an external control element.

8. A timepiece according to claim 6, wherein the switching of the power source is effected via a signal transmitted by the time base of said timepiece.

9. A timepiece according to claim 6, wherein the device forming the dial is further provided with a passage for pipes carrying hands.

10. A timepiece according to claim 6, wherein the front face of the dial forming device is further provided with a decoration or with signs.

* * * * *